UNITED STATES PATENT OFFICE.

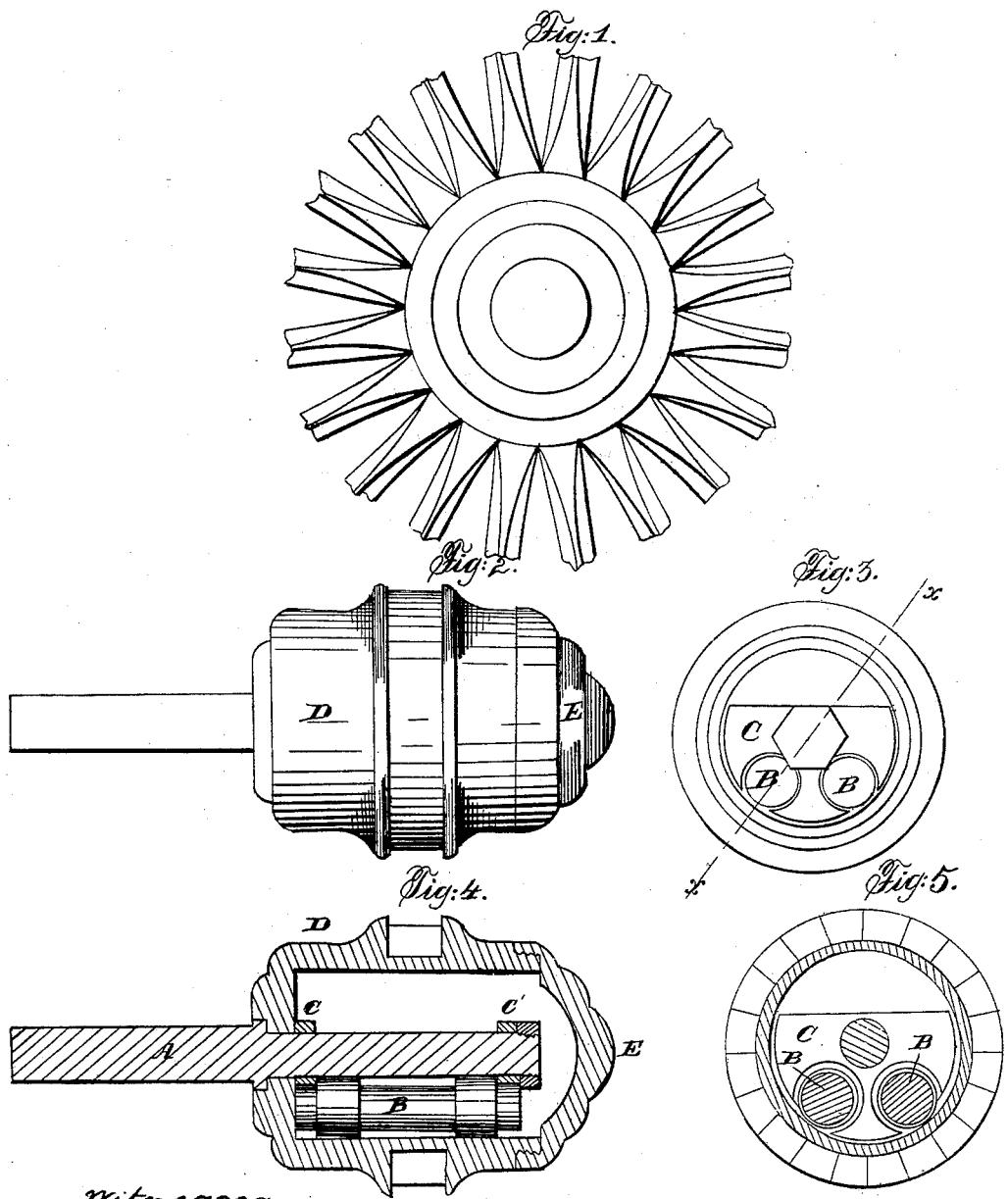

EDMOND C. OTIS, OF VOLUNTOWN, CONNECTICUT.

IMPROVEMENT IN ANTI-FRICTION CARRIAGE-AXLES.

Specification forming part of Letters Patent No. 56,601, dated July 24, 1866.

*To all whom it may concern:*

Be it known that I, EDMOND C. OTIS, of Voluntown, in the county of Windham and State of Connecticut, have invented a new and useful Improvement in Anti-Friction Carriage-Hubs; and I do hereby declare the following, when taken in connection with the accompanying drawings, and the letters of reference marked thereon, to be a full, clear, and exact description of the same, and which said drawings constitute part of this specification, and represent, in—

Figure 1, front end view; Fig. 2, a side view; Fig. 3, an end view with the cap removed; Fig. 4, a longitudinal section on line *x x*; Fig. 5, a transverse central section.

My invention relates to an improvement in hubs of wheels for carriages or vehicles of all descriptions, its object being to lessen the friction; and it consists in attaching to the axle within the hub a pair of rolls, which rest upon the inner surface of the hub and support the axle, the hub revolving around the axle and rolls.

To enable others skilled in the art to construct and use my improvement, I will proceed to describe the same as illustrated in the accompanying drawings.

A is the axle; B B, the rolls, attached to the axle by heads C C, which said heads are firmly fixed to the axle and constructed so as to form bearings for the rolls, as seen in Fig. 4; D, the hub, in its outward form similar to hubs of common construction. It is made of metal, its inner surface bored out of such diameter that the rolls will bear upon the inner surface, the axle being the center of motion, as seen in Figs. 4 and 5, and the hub closed by a cap, E. The axle is fitted to the hub in any known manner, and when the hub is so placed upon the axle then set the inner head, C, upon the axle and secure it thereto in any convenient manner; place the two rolls B B into their bearings in the said head; then set on the outer head, C', which is also secured to the axle in any convenient manner so that it is in position corresponding to the inner head to form the outer bearings of the two rolls; then place the cap E upon the hub, in which condition the wheel is ready for use.

The entire weight of the carriage rests upon the two rolls, the bearings of which are so small as to produce very little friction. The result of this is that the carriage runs much lighter, and all danger of heating from want of lubrication, as in ordinary carriage-boxes, is entirely avoided.

I do not broadly claim friction-rolls within the hub, as such are not new.

Having therefore thus fully described my improvement, what I claim as new and useful, and desire to secure by Letters Patent, is—

The combination of the two rolls B B, fixed to the axle A so as to operate within the hub D, substantially as and for the purpose specified.

EDMOND C. OTIS.

Witnesses:
JOHN E. EARLE,
M. A. HINE.